United States Patent
Bortz

(10) Patent No.: US 8,329,634 B2
(45) Date of Patent: Dec. 11, 2012

(54) WATER BASED PAINT THINNER

(76) Inventor: Steven H. Bortz, Westlake Village, CA (US)

( * ) Notice: Subject to any disclaimer, the term of this patent is extended or adjusted under 35 U.S.C. 154(b) by 378 days.

(21) Appl. No.: 12/837,980

(22) Filed: Jul. 16, 2010

(65) Prior Publication Data

US 2010/0279912 A1 Nov. 4, 2010

Related U.S. Application Data

(63) Continuation-in-part of application No. 11/450,726, filed on Jun. 9, 2006, now Pat. No. 7,785,413.

(60) Provisional application No. 60/690,382, filed on Jun. 10, 2005.

(51) Int. Cl.
   *C11D 7/60* (2006.01)
   *C11D 1/825* (2006.01)
(52) U.S. Cl. ......................... 510/437; 510/434; 106/311
(58) Field of Classification Search .................. 106/311; 510/434, 437
   See application file for complete search history.

(56) References Cited

U.S. PATENT DOCUMENTS

| | | | |
|---|---|---|---|
| 3,192,061 A | 6/1965 | Wilson et al. | |
| 5,340,495 A | 8/1994 | Mulcahy et al. | |
| 6,017,862 A | 1/2000 | Doyel et al. | |
| 6,720,366 B1 * | 4/2004 | Torbus et al. | 523/142 |
| 7,785,413 B2 * | 8/2010 | Bortz | 106/311 |
| 2004/0063042 A1 | 4/2004 | Egbe | |
| 2012/0137449 A1 * | 6/2012 | Ransom et al. | 12/146 B |

FOREIGN PATENT DOCUMENTS

| | | |
|---|---|---|
| JP | 15114540 | 4/2003 |
| KR | 10-2000-63944 | 11/2000 |
| KR | 10-2004-36038 | 4/2004 |

* cited by examiner

*Primary Examiner* — David M Brunsman
(74) *Attorney, Agent, or Firm* — Kenneth L. Green

(57) ABSTRACT

A paint thinner and cleaner includes a methyl soy ester and dibasic ester and satisfies a less than 25 grams per liter Volatile Organic Compound (VOC) rating which permits the thinner and cleaner to be used for cleaning and thinning in government regulated areas. Requirements for reducing VOCs are well recognized. The paint thinner and cleaner of the present invention performs as well as products (for example, hydrocarbon based thinners) having greater than 25 grams per liter VOC products. Further, the paint thinner and cleaner according to the present invention has less than one tenth of the hazardous ingredients present in the other paint thinners. The paint thinner and cleaner is suitable for reducing water and oil based coatings and material.

13 Claims, No Drawings

WATER BASED PAINT THINNER

The present application claims the benefit of U.S. Provisional Patent Application Ser. No. 60/690,382 filed Jun. 10, 2005 and is a Continuation In Part of U.S. patent application Ser. No. 11/450,726 filed Jun. 09, 2006, now U.S. Pat. No. 7,785,413 which applications are incorporated in their entirety herein by reference.

BACKGROUND OF THE INVENTION

The present invention relates to low vapor pressure paint thinners and in particular to a paint thinner containing less than 25 grams per liter of Volatile Organic Compounds (VOCs).

Many known thinners for paints and other coatings contain hazardous ingredients such as Methyl Ethyl Ketone (MEK), isopropyl alcohol, methanol, mak, butyl cellusolve, petroleum naptha, and toluene. While such paints containing such ingredients perform adequately, their use of these hazardous ingredients is a major disadvantage and paints containing such ingredients are prohibited in government regulated areas when the paint includes more than 25 grams per liter of VOCs. While acetone alone can be used as a thinner, it is too volatile for many coatings when used as the sole thinner. In hot areas, if an acetone thinned coating is sprayed onto a surface, it can partially dry before the spray hits the material being coated. Because paints necessarily include a thinner to reduce their viscosity, a thinner providing less than 25 grams per liter of VOCs is needed.

BRIEF SUMMARY OF THE INVENTION

The present invention addresses the above and other needs by providing a paint thinner and cleaner which includes a methyl soy ester and dibasic ester and satisfies a less than 25 grams per liter Volatile Organic Compound (VOC) rating which permits the thinner and cleaner to be used for cleaning and thinning in government regulated areas. Requirements for reducing VOCs are well recognized. The paint thinner and cleaner of the present invention performs as well as products (for example, hydrocarbon based thinners) having greater than 25 grams per liter VOC products. Further, the paint thinner and cleaner according to the present invention has less than one tenth of the hazardous ingredients present in the other paint thinners. The paint thinner and cleaner is suitable for reducing water and oil based coatings and material.

In accordance with one aspect of the invention, there is provided a water based water and oil based paint thinner comprising between 50 and 90 percent by volume of base deionized water, between one and ten percent by volume of methyl soy ester material, and between one and ten percent by volume of dibasic ester.

In accordance with another aspect of the invention, there is provided a water based cleaner comprising between 50 and 90 percent by volume of base deionized water, between one and ten percent by volume of methyl soy ester material, and between one and ten percent by volume of dibasic ester.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The South Coast Air Quality Management District (South Coast AQMD) has adopted the most stringent air quality regulations in the United States. Based on South Coast AQMD guidelines, paints are required to have less than 25 grams per liter of Volatile Organic Compounds (VOCs). This thinner has the ability to reduce most all coatings that are water based or oil based such as solvent borne enamels, water based primers, water based wall paint, water and oil based stains, and most all coating material.

The paint thinner and cleaner of the present invention includes the following essential ingredients:

1) between 50 and 90 percent by volume of base deionized water and preferably between 70 and 90 percent by volume of base deionized water (used as a carrier of other ingredients used to dissolve and or blend with coatings, pastes and other liquid gels and non solid material);

2) preferably between one and ten percent by volume of methyl soy ester material and more preferably between one and five percent by volume of the methyl soy ester material (added to the base to give dissolving power for the purpose of cleaning and reducing water and oil based coatings and material); and 3) preferably between one and ten percent by volume of dibasic ester and more preferably between one and five percent by volume of the dibasic ester (added to the base to give dissolving power for the purpose of cleaning and reducing water and oil based coatings and material);

The paint thinner and cleaner of the present invention preferably includes ingredients selected from the following two ingredients:

4) preferably between 0.1 and five percent by volume of a surfactant and more preferably 0.1 and 2.5 percent by volume of the surfactant (enables the non water base ingredients to polarize with the water);

5) preferably between 0.1 and five percent by volume of an emulsifier and more preferably 0.1 and 2.5 percent by volume of the emulsifier (aids the non water base ingredients to polarize with the surfactant and the water);

The paint thinner and cleaner of the present invention further may include ingredients selected from the following ten ingredients:

6) preferably between 0.5 and ten percent by volume of parachlorobenzotrifloride (PCBTF) and more preferably between one and five percent by volume of PCBTF, (aids in the dissolving strength of the paint thinner and helps provide an acceptable drying time);

7) preferably between 0.5 and ten percent by volume of aliphatic hydrocarbon and more preferably between one and five percent by volume of aliphatic hydrocarbon (aids in the dissolving strength of the paint thinner and helps provide an acceptable drying time);

8) preferably between 0.5 and ten percent by volume of acetone chemical and more preferably between one and five percent by volume of acetone chemical (aids in the dissolving strength of the paint thinner and helps provide an acceptable drying time);

9) preferably between 0.5 and ten percent by volume of methyl acetate chemical and more preferably between one and five percent by volume of methyl acetate chemical (aids in the dissolving strength of the paint thinner and helps provide an acceptable drying time);

10) preferably between 0.5 and ten percent by volume of methyl alcohol and more preferably between one and five percent by volume of methyl alcohol (aids in the dissolving strength of the paint thinner and helps provide an acceptable drying time);

11) preferably between 0.5 and ten percent by volume of ethyl alcohol and more preferably between one and five percent by volume of ethyl alcohol (aids in the dissolving strength of the paint thinner and helps provide an acceptable drying time);

12) preferably between 0.5 and ten percent by volume of tetrahydrofurfuryl alcohol and more preferably between one and five percent by volume of tetrahydrofurfuryl alcohol (aids in the dissolving strength of the paint thinner and helps provide an acceptable drying time);

13) preferably between 0.5 and ten percent by volume of aromatic hydrocarbon and more preferably between one and five percent by volume of aromatic hydrocarbon (aids in the dissolving strength of the paint thinner and helps provide an acceptable drying time);

14) preferably between 0.5 and ten percent by volume of dimethyl carbonate and more preferably between one and five percent by volume of dimethyl carbonate (aids in the dissolving strength of the paint thinner and helps provide an acceptable drying time); and 15) preferably between 0.5 and ten percent by volume of propylene glycol and more preferably between one and five percent by volume of propylene glycol (aids in the dissolving strength of the paint thinner and helps provide an acceptable drying time).

The aliphatic hydrocarbon preferably has a flash point between 20 and 150 degree Fahrenheit. Various combination of essential ingredients 4-15 may be utilized to attain the required drying profile and stay under the required 25 grams per liter of VOCs, and any combination of ingredients including ingredients 1-3 in the cited amounts and a combination of ingredients 4-15 resulting in less than 25 grams per liter of VOCs is intended to come within the scope of the present invention. Further, any combination of essential ingredients including ingredients 1-3 in the cited amounts and a combination of ingredients equivalent to ingredients 4-15 resulting in less than 25 grams per liter of VOCs is intended to come within the scope of the present invention.

A preferred methyl soy ester material comprising a soy based emulsion is sold under the trademarks SG5000E and SG1000E by Soy Technologies, LLC of Nichokasville, Ky. 40356. This soy based ester is a combination of soybean methyl esters dibasic esters and triethanolamine. The soy based methyl ester is a mixture of hexadecanoic acid, octadecanoic acid, 9-octadecenoic acid (Z)-, 9, 12-Octadecadienoic acid (Z,Z)- and 9. 12, 15-Octadecatrienoic acid (9Z. 12Z. 15Z). The dibasic ester is a mixture of dimethyl glutarate, dimethyl adipate and dimethyl succinate.

The result is a thinner and cleaner which is not only useful in reducing or thinning of coatings and most all water and oil based material, but is also useful for cleaning. When used as a cleaner, the solution leaves a barrier which helps prevent rust on metal and extends the life of a natural bristle brush or lamb's wool roller. The thinner and cleaner at the same time complies with government air regulations and is very beneficial to the environment.

While the invention herein disclosed has been described by means of specific embodiments and applications thereof, numerous modifications and variations could be made thereto by those skilled in the art without departing from the scope of the invention set forth in the claims.

I claim:

1. A paint thinner and cleaner providing less than 25 grams per liter of Volatile Organic Compound (VOC), the paint thinner and cleaner comprising:

between 50 and 90 percent by volume of base deionized water;

between one and ten percent by volume of methyl soy ester material; and between one and ten percent by volume of dibasic ester.

2. The paint thinner and cleaner of claim 1, wherein the dibasic ester is selected from the group consisting of dimethyl gluturate, dimethyl adipate, dimethyl succinate, and mixtures thereof.

3. The paint thinner and cleaner of claim 1, further including additional ingredients which improves in the dissolving strength of the paint thinner and helps provide an acceptable drying time, while resulting in less than 25 grams per liter of VOCs.

4. The paint thinner and cleaner of claim 1, further including an additional ingredient which aids non water base ingredients in polarizing with the water.

5. The paint thinner and cleaner of claim 4, wherein the additional ingredient comprises a surfactant.

6. The paint thinner and cleaner of claim 5, wherein the surfactant comprises between 0.1 and five percent by volume of the surfactant.

7. The paint thinner and cleaner of claim 5, further including an additional ingredient which aids the non water base ingredients in polarizing with the surfactant and the water.

8. The paint thinner and cleaner of claim 7, wherein the additional ingredient comprises an emulsifier.

9. The paint thinner and cleaner of claim 8, wherein the emulsifier comprises between 0.1 and five percent by volume of the emulsifier.

10. The paint thinner and cleaner of claim 1, wherein the base deionized water comprises between 70 and 90 percent by volume of base deionized water.

11. A paint thinner and cleaner providing less than 25 grams per liter of Volatile Organic Compound (VOC), the paint thinner and cleaner comprising:

between 50 and 90 percent by volume of base deionized water;

between one and ten percent by volume of methyl soy ester material;

between one and ten percent by volume of dibasic ester;

between 0.1 and five percent by volume of surfactant; and between 0.1 and five percent by volume of emulsifier.

12. The paint thinner and cleaner of claim 11, wherein the base deionized water comprises between 70 and 90 percent by volume of base deionized water.

13. A paint thinner and cleaner providing less than 25 grams per liter of Volatile Organic Compound (VOC), the paint thinner and cleaner comprising:

between 70 and 90 percent by volume of base deionized water;

between one and ten percent by volume of methyl soy ester material;

between one and ten percent by volume of dibasic ester;

between 0.1 and five percent by volume of a surfactant; and between 0.1 and five percent by volume of an emulsifier; and additional ingredients resulting in less than 25 grams per liter of VOCs, the additional ingredients including at least one ingredient selected from the set consisting of:

between 0.5 and ten percent by volume of parachlorobenzotrifloride (PCBTF);

between 0.5 and ten percent by volume of aliphatic hydrocarbon;

between 0.5 and ten percent by volume of acetone chemical;

between 0.5 and ten percent by volume of methyl acetate chemical;

between 0.5 and ten percent by volume of methyl alcohol;
between 0.5 and ten percent by volume of ethyl alcohol;
between 0.5 and ten percent by volume of tetrahydrofurfuryl alcohol;
between 0.5 and ten percent by volume of aromatic hydrocarbon;
between 0.5 and ten percent by volume of dimethyl carbonate; and
between 0.5 and ten percent by volume of propylene glycol.

* * * * *